(12) United States Patent  (10) Patent No.: US 7,434,749 B2
Wu                         (45) Date of Patent:    Oct. 14, 2008

(54) SPRAYER

(76) Inventor: Scott Wu, No. 6, Lane 176, Wu Fu Road, Wu Feng Hsiang, Taichung Hsien (TW)

( * ) Notice: Subject to any disclaimer, the term of this patent is extended or adjusted under 35 U.S.C. 154(b) by 318 days.

(21) Appl. No.: 11/164,981

(22) Filed: Dec. 13, 2005

(65) Prior Publication Data

US 2007/0131790 A1 Jun. 14, 2007

(51) Int. Cl.
A62C 11/00 (2006.01)
B05B 9/043 (2006.01)
B67D 5/64 (2006.01)

(52) U.S. Cl. ............... 239/333; 239/332; 239/302; 239/337; 239/351; 222/175; 222/173; 15/321; 137/596.17

(58) Field of Classification Search ........... 239/373, 239/352, 304, 722, 333, 337, 149, 328, 152, 239/146; 222/175, 626; 285/308, 317, 318
See application file for complete search history.

(56) References Cited

U.S. PATENT DOCUMENTS

| 3,593,391 | A | * | 7/1971 | Routh | 425/129.1 |
| 4,782,982 | A | * | 11/1988 | Ellison | 222/1 |
| 5,601,317 | A | * | 2/1997 | Crouse et al. | 285/242 |
| 5,622,056 | A | * | 4/1997 | Utter | 62/121 |
| 6,094,773 | A | * | 8/2000 | Krentz et al. | 15/321 |
| 6,766,966 | B2 | * | 7/2004 | You | 239/146 |
| 7,213,616 | B2 | * | 5/2007 | Wuollet et al. | 137/625.48 |

OTHER PUBLICATIONS

Taiwanese Patent Publication No. 150571, Jan. 21, 1991, 2 pages.

* cited by examiner

Primary Examiner—Dinh Nguyen
Assistant Examiner—James S Hogan
(74) Attorney, Agent, or Firm—Alan Kamrath; Kamrath & Associates PA

(57) ABSTRACT

A direct-current sprayer includes a shell with an outlet therein, a valve in the outlet, a pipe leading to the valve from a pump in the shell and a hose detachably connected to the valve so that water can flow from a pump in the shell into the hose through the valve. The valve automatically blocks the flow of the water after the hose is detached from the valve.

32 Claims, 9 Drawing Sheets

A - A

A - A

SPRAYER

BACKGROUND OF INVENTION

1. Field of Invention

The present invention relates to a sprayer and, more particularly, to a direct-current sprayer with a detachable hose.

2. Related Prior Art

Disclosed in Taiwanese Patent Publication No. 150571 is a sprayer for spraying water by pressurizing the water. The sprayer can be used to wash a building or a vehicle. The sprayer is equipped with a water cannon 50 connected to a hose 52 connected to a container 30 installed in a shell 20. When not in use, the water cannon 50 can be detached from the hose 52, and the hose 52 can be detached from the container 30. However, the water cannon 50 and the hose 52 cannot be packed up.

The present invention is therefore intended to obviate or at least alleviate the problems encountered in the prior art.

SUMMARY OF INVENTION

According to the present invention, a direct-current sprayer includes a shell with an outlet therein, a valve in the outlet, a pipe leading to the valve from a pump in the shell and a hose detachably connected to the valve so that water can flow from a pump in the shell into the hose through the valve. The valve automatically blocks the flow of the water after the hose is detached from the valve.

The primary advantage of the sprayer according to the present invention is that the hose can be detached from the shell and cleaned well.

Other advantages and features of the present invention will become apparent from the following description referring to the drawings.

BRIEF DESCRIPTION OF DRAWINGS

The present invention will be described through the description of two embodiments referring to the drawings.

DETAILED DESCRIPTION OF EMBODIMENTS

Figure 1:
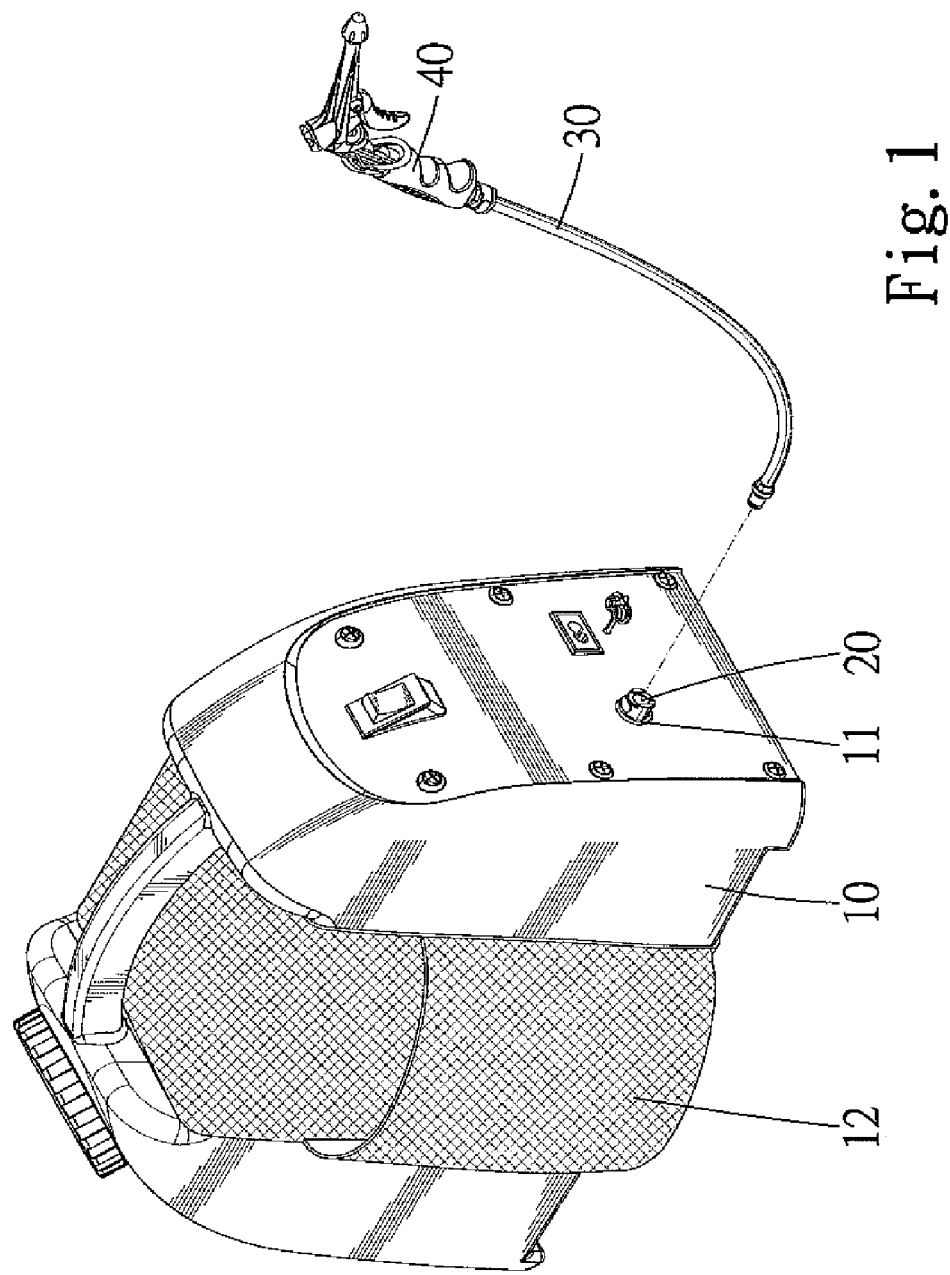
FIG. 1 is a perspective view of a sprayer according to the first embodiment of the present invention.
Figure 2:
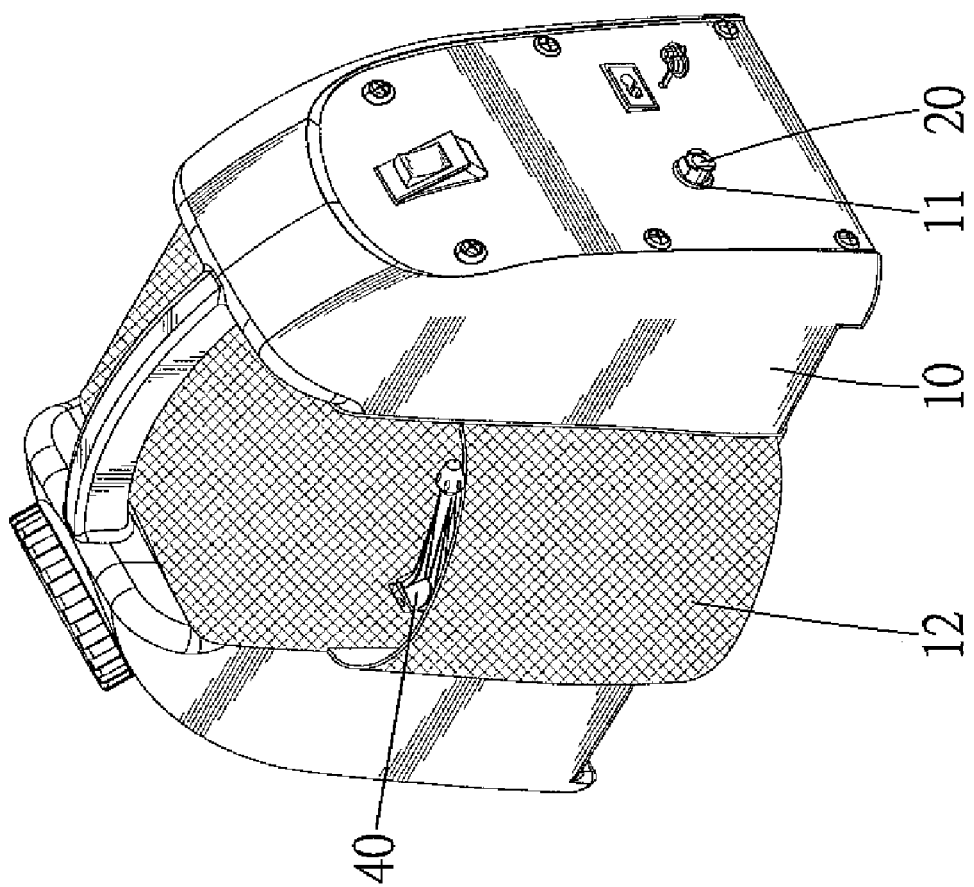
FIG. 2 is a perspective view of the sprayer shown in FIG. 1, with a hose and a nozzle removed.

Referring to FIGS. 1 and 2, there is a direct-current sprayer according to a first embodiment of the present invention. The sprayer includes a shell 10, a valve 20 installed on the shell 10, a hose 30 connected to the valve 20 and a nozzle 40 connected to the hose 30.

Although not shown, a container, a pump and a motor are installed in the shell 10. The container contains water. The pump pressurizes the water. The motor drives the pump. The container, the pump and the motor used in the sprayer according to the present invention may be those shown in Taiwanese Patent Publication No. 150571 or any other proper conventional devices.

The valve 20 is installed in an outlet 11 in the shell 10. When the container is filled with water, the water will not leak from the container through the valve 20 if the hose 30 is detached from the valve 20. The container 10 includes a pocket 12 for storing the hose 30, the nozzle 40 and other elements such as a wire.

Figure 3:
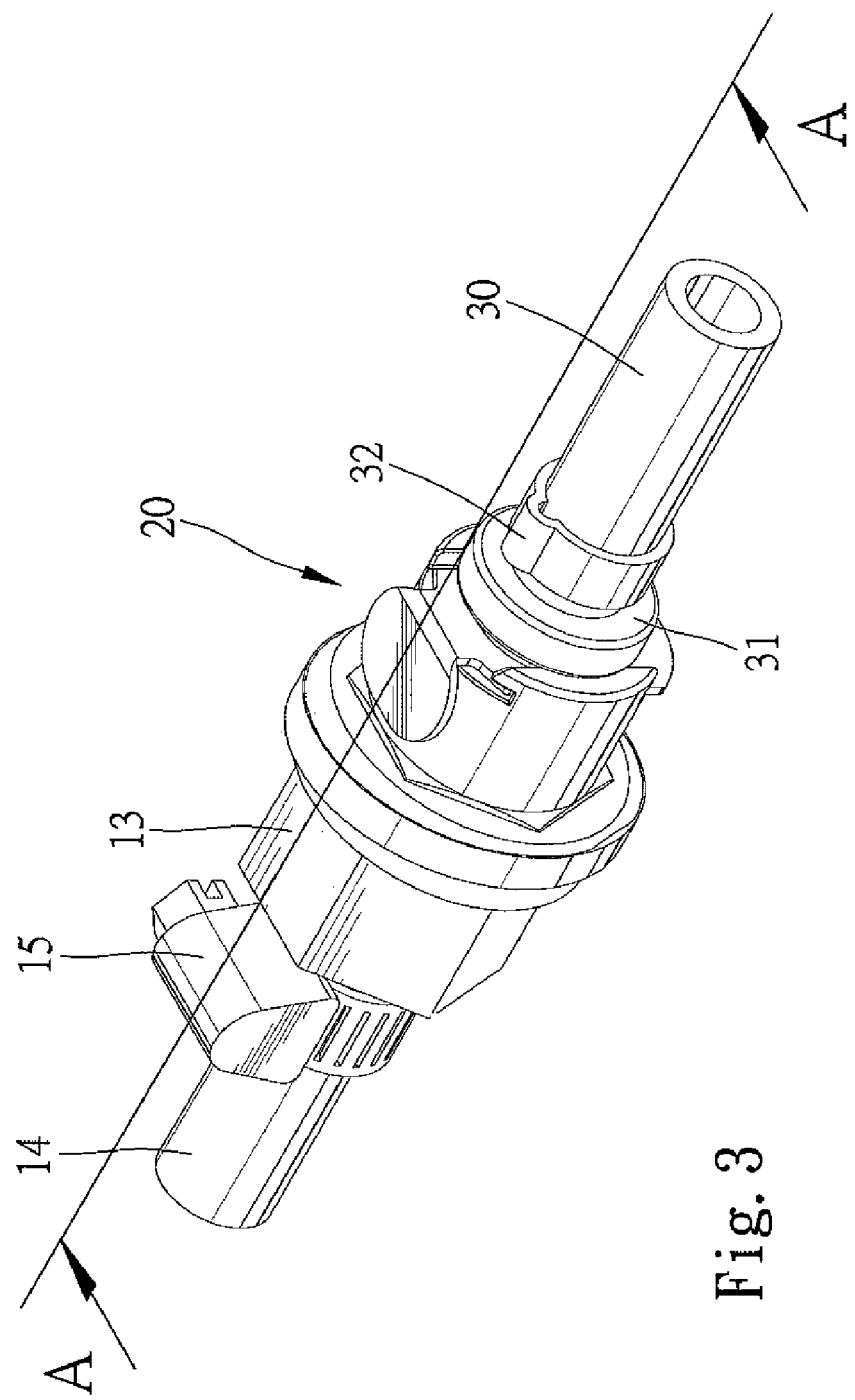
FIG. 3 is a perspective view of a check valve of the sprayer shown in FIG. 1.
Figure 4:
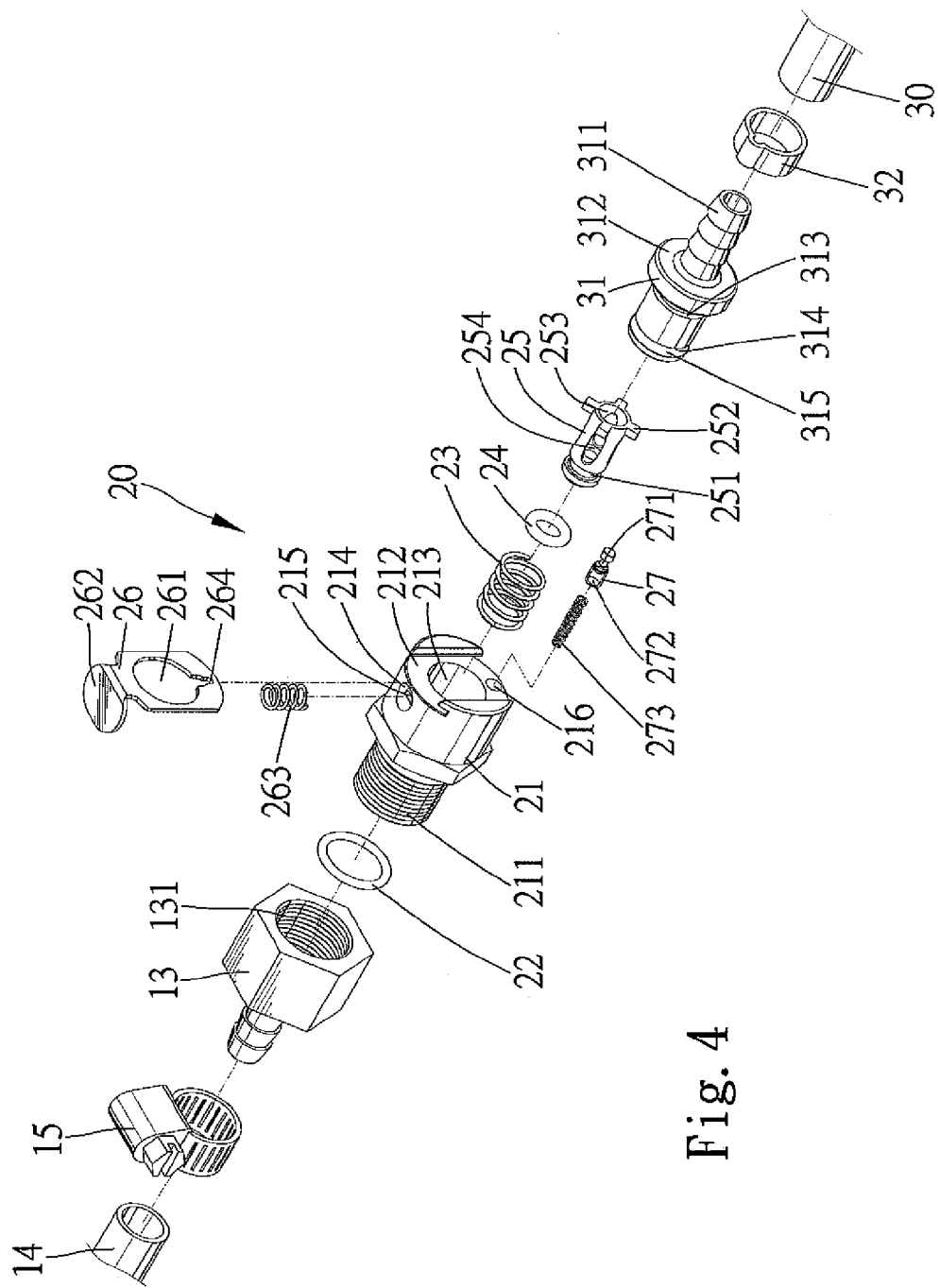
FIG. 4 is an exploded view of the check valve shown in FIG. 3.

Referring to FIGS. 3 and 4, the valve 20 is provided between a pipe 14 and the hose 30. The pipe 14 is located in the shell 10 while the hose 30 is located outside the shell 10. Although not shown, the pipe 14 is connected to the pump.

A joint 13 is connected to the pipe 14. The joint 13 includes a first section and a second section. The first section of the joint 13 is formed as an anchor for insertion in the pipe 14. The periphery of the anchor is serrate. The periphery of the second section of the joint 13 is hexagonal that can be held by a wrench. A strap 15 is used to tighten the pipe 14 against the anchor. A thread 131 is formed on the interior of the second section of the joint 13.

A joint 31 connected to the hose 30. The joint 31 includes a first section, a second section and a third section. The first section of the joint 31 is formed as an anchor 311 for insertion in the hose 30. The periphery of the anchor 311 is serrate. A ferrule 32 is used to tighten the hose 30 around the anchor 311. The second section of the joint 31 is formed as a flange 312. The third section of the joint 31 includes a neck 313 with a reduced diameter. There is a groove 314 around the third section of the joint 31. A seal 315 is located in the groove 314.

The valve 20 includes a housing 21, a core 25 movable in the housing 21, a seal 24 installed on the core 25, a spring 23 compressed between the housing 21 and the core 25, a shackle 26 for locking third section of the joint 31 to the housing 21 and a latch 27 for retaining the shackle 26.

The housing 21 defines a channel 213 axially. Formed on the wall of the channel 213 is a rib 218 (FIG. 5), thus dividing the channel 213 into a first section and a second section. The rib 218 includes an inclined side and a vertical side. The housing 21 includes a first section, a second section and a third section. Formed on the first section of the housing 21 is a thread 211. The periphery of the second section of the housing 21 is hexagonal that can be driven by a wrench. A dovetail groove 212 is defined in an end surface of the third section of the housing 21. A recess 216 is defined in the end surface of the third section of the housing 21. A cavity 214 is defined in the periphery of the third section of the housing 21. From the bottom of the cavity 214 projects a stem 215.

The core 25 includes a groove 251 around a first end, a plurality of protrusions 252 on the periphery of a second end and a passageway 253 therein axially. The passageway 253 is closed at the first end and open at the second end. In the periphery of the core 25 is a slot 254 in communication with the passageway 253.

The shackle 26 defines an opening 261 and a slit 264 in communication with the opening 261. A tab 262 transversely extends from the shackle 26.

The latch 27 includes a recess 272 in a first end and a neck 271 with a reduced diameter near a second end.

Figure 5:
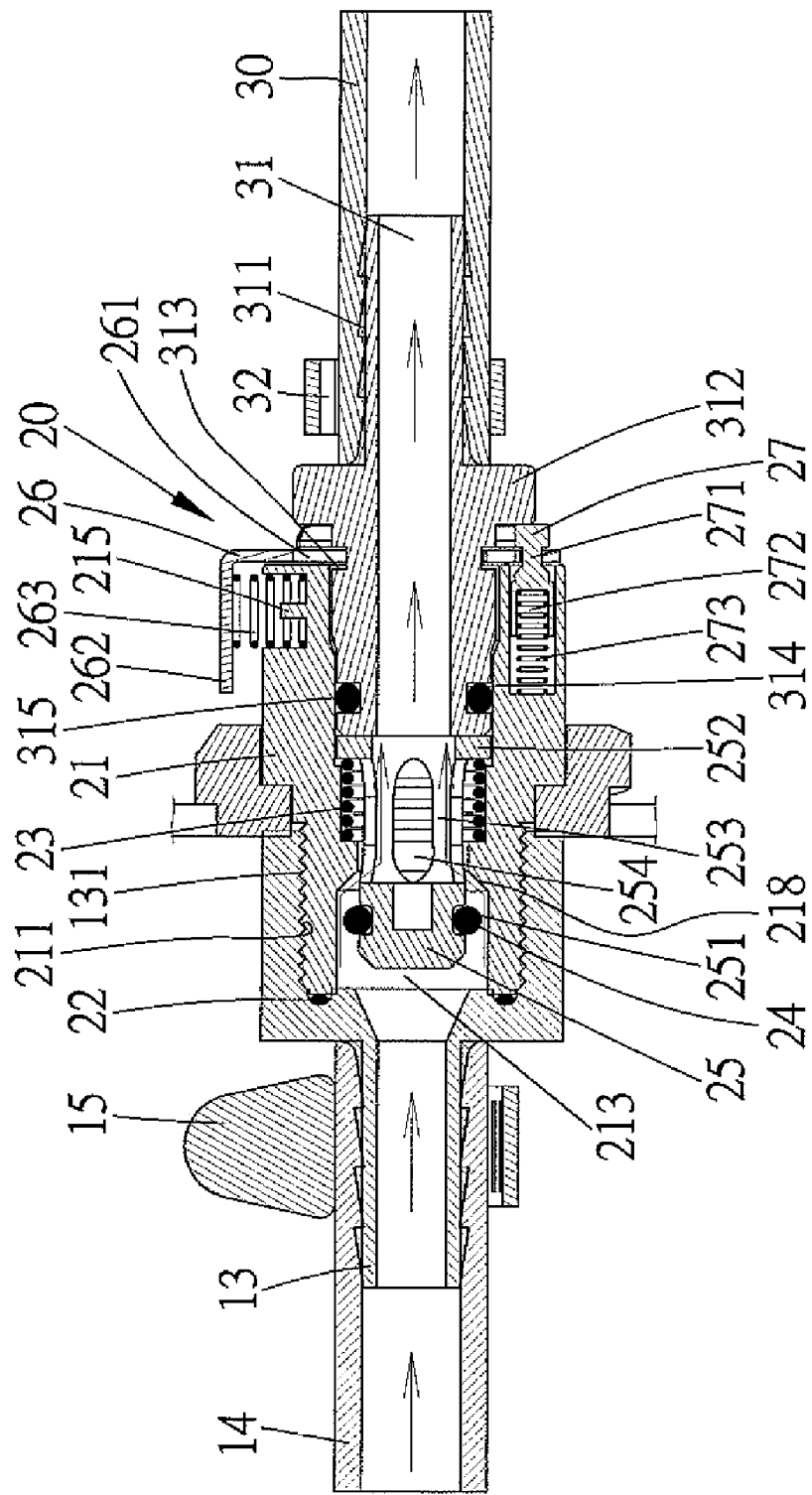
FIG. 5 is a cross-sectional view of the check valve taken along a line A-A in FIG. 3.

Referring to FIG. 5, the spring 23 is positioned around the core 25. The core 25 is positioned in the channel 213 of the housing 21. The first end of the core 25 is in the first section of the channel 213 while the second end of the core 25 is in the second section of the channel 213. The spring 23 is compressed between the rib 218 and the protrusions 252. The seal 24 is positioned in the groove 251 of the core 25.

A spring 263 is positioned in the cavity 214 around the stem 215. A spring 273 is positioned in the recess 216. The latch 27 is pressed into the recess 216 of the housing 21 before the shackle 26 is inserted into the dovetail grove 212. When the latch 27 is released, the first end thereof is inserted through the opening 261. The spring 263 is compressed between the floor of the cavity 214 and the tab 262 in order to lift the shackle 26 by the tab 262. The slit 264 of the shackle 26 receives the neck 271 of the latch 27.

A seal 22 is provided between the first section of the housing 21 and the second section of the joint 13. The thread 211 of the housing 21 is engaged with the thread 131 of the joint 13.

The third section of the joint 31 is inserted in the channel 213 of the housing 21. The shackle 26 locks the neck 313 of the joint 31. The joint 31 pushes the core 25. The seal 24 is away from the rib 218. Water can flow from the first section of the channel 213 of the housing 21 into the passageway 253 through the slot 254 of the core 25. The water can flow into the hose 30 through the joint 31.

Figure 6:
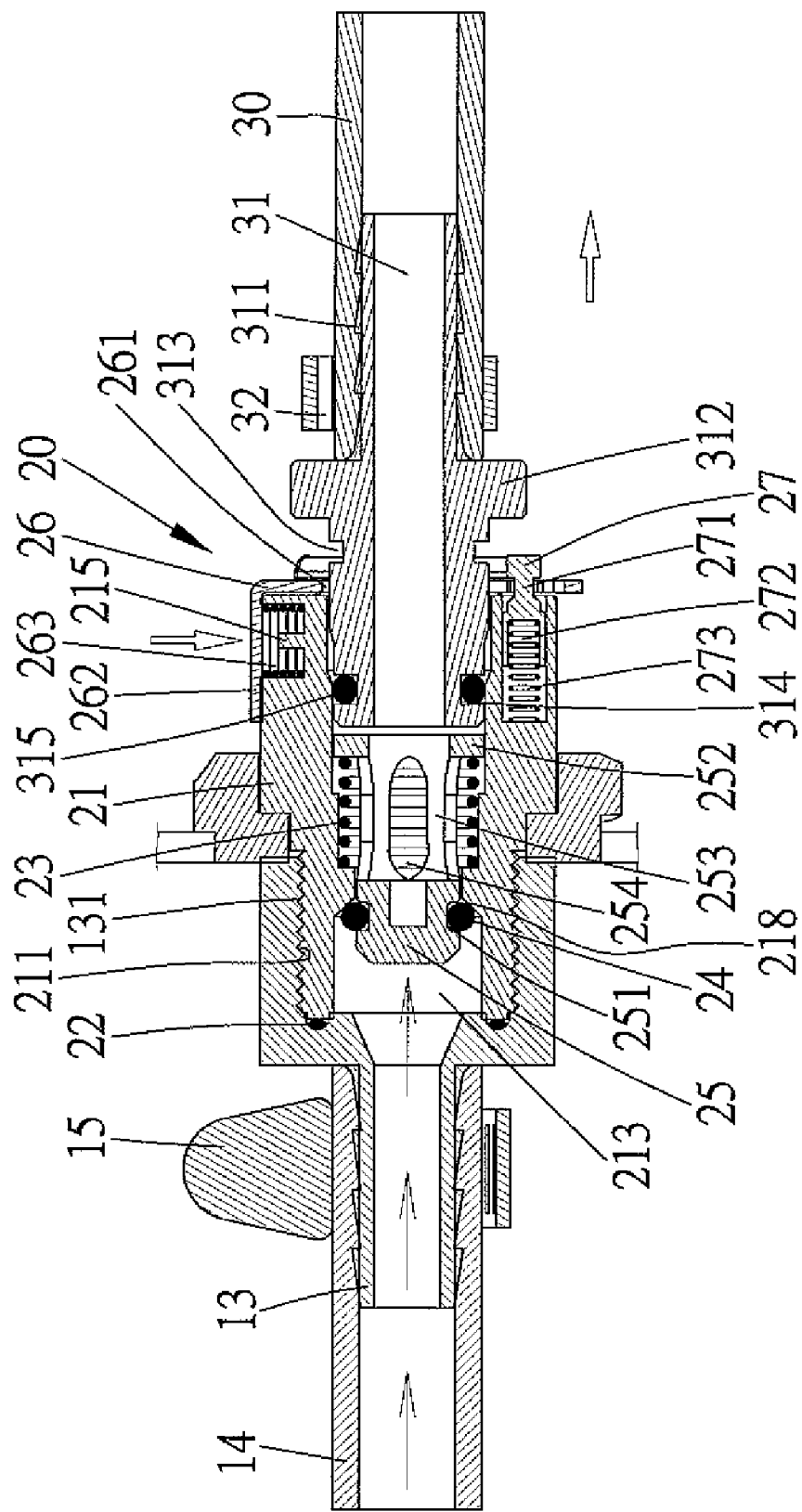
FIG. 6 is a cross-sectional view of the check valve in another position than shown in FIG. 5.
Figure 7:
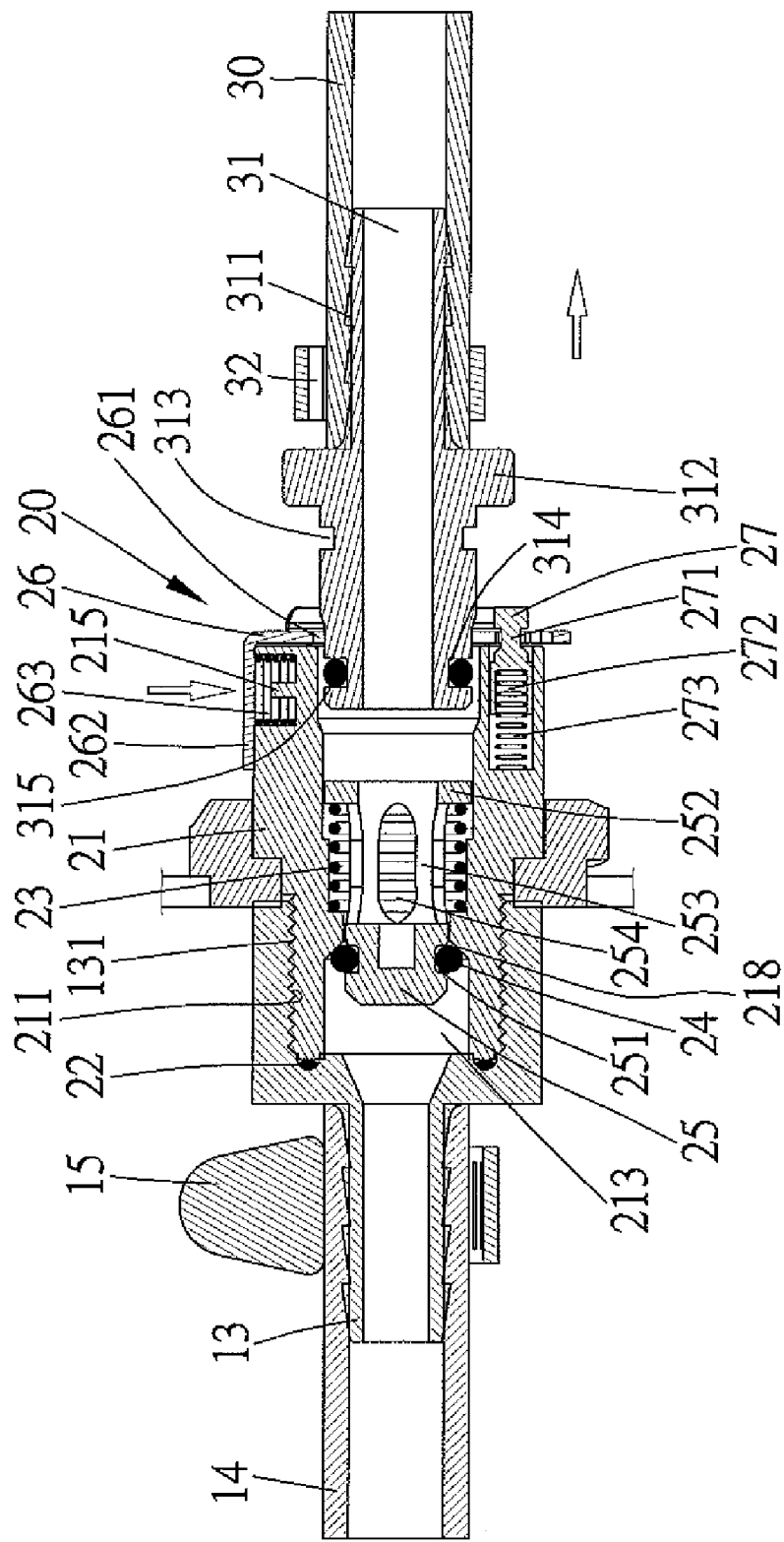
FIG. 7 is a cross-sectional view of the check valve in another position than shown in FIG. 6.

Referring to FIGS. 6 and 7, as indicated by an arrowhead, a force is exerted on the tab 262 so that the shackle 26 is lowered, thus releasing the joint 31 from the shackle 26. The spring 23 causes seal 24 to abut the rib 218 again, thus blocking the flow of the water.

Figure 8:
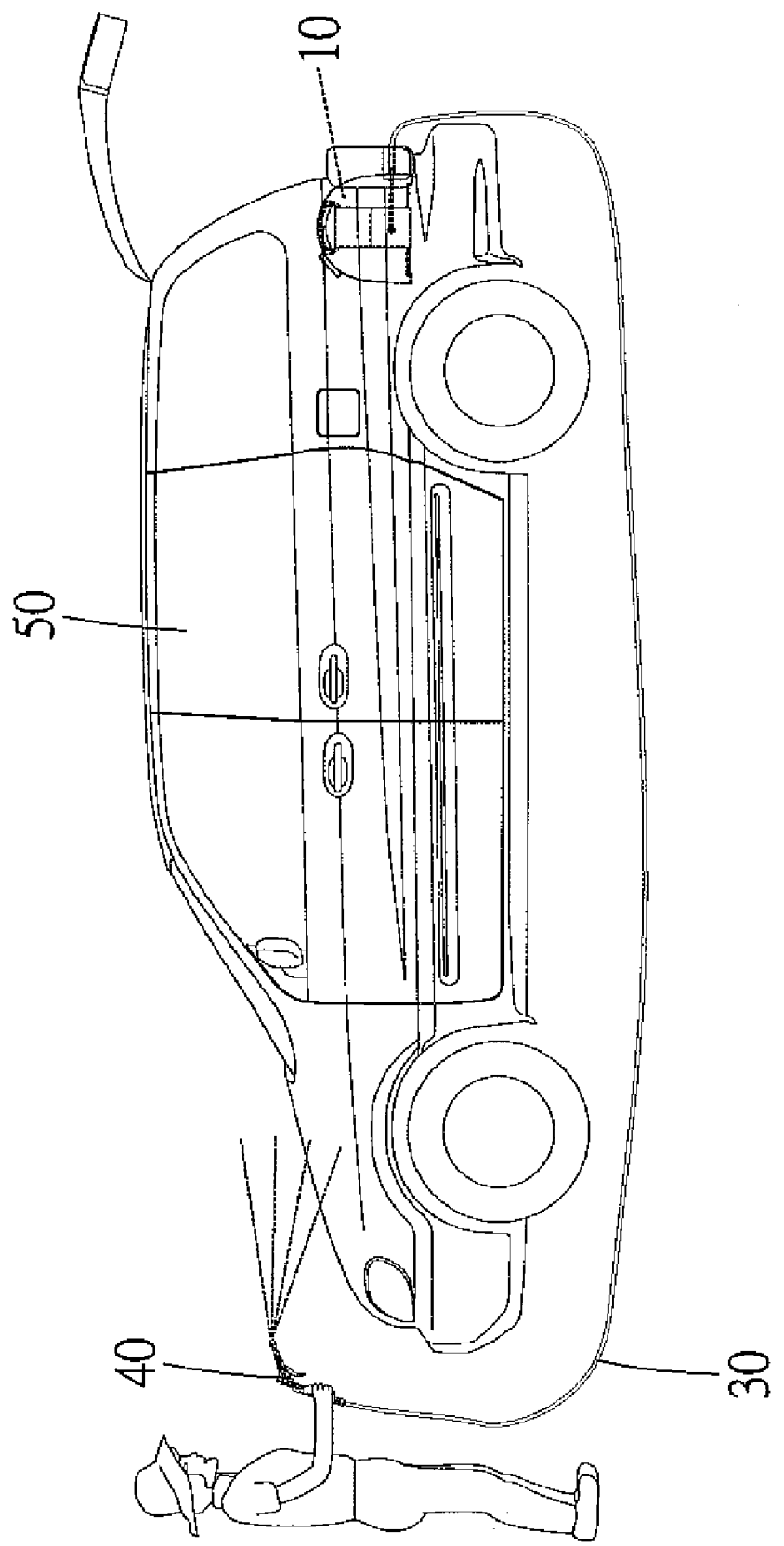
FIG. 8 is a side view of a vehicle washed with water sprayed from the sprayer shown in FIG. 1.

Referring to FIG. 8, a user washes a vehicle 50 with water from the nozzle 40. The sprayer is electrically connected to the vehicle 50. After having a good time in the wild or on the beach, the user can have a shower with water sprayed from the nozzle 40. Thus, the user can keep the interior of the vehicle 50 clean. After use, the user can push the shackle 26 by the tab 262, thus releasing the joint 31 from the shackle 26. Meanwhile, the valve 20 can automatically block the flow of the water. The hose 30 and the nozzle 40 can be cleaned well and stored in the pocket 12.

Figure 9:
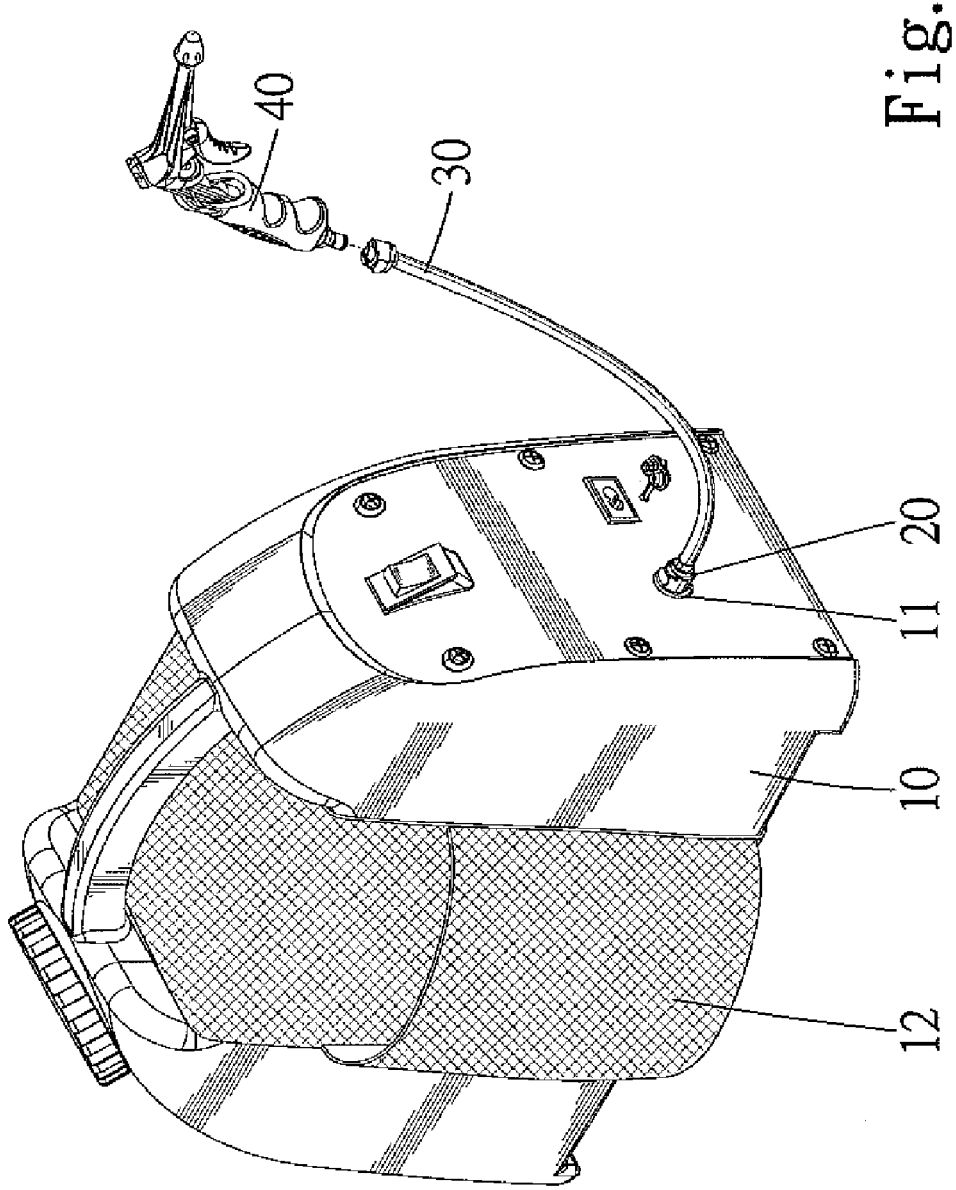
FIG. 9 is a perspective view of a sprayer according to the second embodiment of the present invention.

Referring to FIG. 9, there is shown a sprayer according to a second embodiment of the present invention. The second embodiment is like the first embodiment except a few things. Firstly, the valve 20 is connected to the hose 30 through the joint 13. Secondly, the joint 31 is connected to the pipe 14. Thus, when the valve 20 is detached from the joint 31, water will not leak from the hose 30.

The direct-current sprayer according to the present invention exhibits the following advantages:

Firstly, the valve 20 is used so that the hose 30 can be detached from the shell 10. Thus, the hose 30 and the nozzle 40 can be cleaned well.

Secondly, the pocket 12 is used to store the hose 30 and the nozzle 40 so that the entire sprayer occupies a small space and looks good.

Thirdly, the valve 20 avoids leakage from the shell 10 or the hose 30.

The present invention has been described through the description of the embodiments. Those skilled in the art can derive variations from the embodiments without departing from the scope of the present invention. Therefore, the embodiments shall not limit the scope of the present invention defined in the claims.

What is claimed is:

1. A direct-current sprayer for spraying water comprising: a shell comprising an outlet therein, a valve in the outlet and comprising a housing and a core movable in the housing, with the housing having on an internal side a rib for abutment with the core in order to block the flow of the water, and with the core comprising a closed end, an open end, a passageway extending to the open end from the closed end and at least one slot in communication with the passageway;

a pipe connecting the valve to a pump in the shell; and a hose detachably connected to the valve so that water can flow from a pump in the shell into the hose through the valve, wherein water can flow into the passageway through the slot when the core is pushed by an end of the hose, wherein the valve automatically blocks the flow of the water after the hose is detached from the valve.

2. The direct-current sprayer according to claim 1 wherein the shell comprises a pocket thereon for storing the hose.

3. The direct-current sprayer according to claim 1 comprising a joint for connecting the pipe to the valve.

4. The direct-current sprayer according to claim 3 wherein the joint comprises a first section for insertion in the pipe and a second section for receiving a portion of the valve.

5. The direct-current sprayer according to claim 4 wherein the joint comprises a thread on an internal side of the second section, wherein the joint comprises a thread for engagement with the thread of the joint.

6. The direct-current sprayer according to claim 4 comprising a strap for tightening the pipe around the first section of the joint.

7. The direct-current sprayer according to claim 1 wherein the rib comprises an inclined side for contact with the core.

8. The direct-current sprayer according to claim 1 comprising a seal for sealing contact with the rib.

9. The direct-current sprayer according to claim 1 comprising a joint comprising a first section for insertion in the hose, a second section for abutment with the vale and a third section for easy connection to the valve.

10. The direct-current sprayer according to claim 9 comprising a ferrule for tightening the hose around the first section of the joint and a seal around the third section of the joint for sealing contact with an internal side of the valve, wherein the joint comprises, around the third section, a groove for receiving the seal, wherein the second section of the joint is a flange.

11. The direct-current sprayer according to claim 9 comprising a shackle movable on the valve between a locking position for locking the third section of the joint and a releasing position for releasing the third section of the joint.

12. A direct-current sprayer for spraying water comprising:
a shell comprising an outlet therein;
a valve in the outlet;
a pipe connecting the valve to a pump in the shell;
a hose detachably connected to the valve so that water can flow from a pump in the shell into the hose through the valve, wherein the valve automatically blocks the flow of the water after the hose is detached from the valve;
a joint comprising a first section for insertion in the hose, a second section for abutment with the vale and a third section for easy connection to the valve;
a ferrule for tightening the hose around the first section of the joint and a seal around the third section of the joint for sealing contact with an internal side of the valve, wherein the joint comprises, around the third section, a groove for receiving the seal, wherein the second section of the joint is a flange; and
a shackle movable on the valve between a locking position for locking the third section of the joint and a releasing position for releasing the third section of the joint;
wherein the shackle defines an opening through which the third section of the joint can be inserted into the valve, wherein the joint comprises, on the third section, a neck that can be locked by the shackle.

13. The direct-current sprayer according to claim 12 wherein the valve comprises a housing and a core movable in the housing.

14. The direct-current sprayer according to claim 13 wherein the housing comprises, on an internal side, a rib for abutment with the core in order to block the flow of the water.

15. The direct-current sprayer according to claim 14 wherein the core comprising a closed end, an open end, a passageway extending to the open end from the closed end, at least one slot in communication with the passageway so that the water can flow into the passageway through the slot when the core is pushed by an end of the hose.

16. A direct-current sprayer for spraying water comprising:
   a shell comprising an outlet therein;
   a valve in the outlet;
   a pipe connecting the valve to a pump in the shell;
   a hose detachably connected to the valve so that water can flow from a pump in the shell into the hose through the valve, wherein the valve automatically blocks the flow of the water after the hose is detached from the valve;
   a joint comprising a first section for insertion in the hose, a second section for abutment with the vale and a third section for easy connection to the valve;
   a ferrule for tightening the hose around the first section of the joint and a seal around the third section of the joint for sealing contact with an internal side of the valve, wherein the joint comprises, around the third section, a groove for receiving the seal, wherein the second section of the joint is a flange;
   a shackle movable on the valve between a locking position for locking the third section of the joint and a releasing position for releasing the third section of the joint; and
   a latch with a neck, wherein the shackle defines a slit for receiving the neck of the latch, thus avoiding detachment of the shackle from the valve.

17. A direct-current sprayer for spraying water comprising:
   a hose;
   a valve connected to the hose and comprising a housing and a core movable in the housing, with the housing having on an internal side a rib for abutment with the core in order to block the flow of the water, and with the core comprising a closed end, an open end, a passageway extending to the open end from the closed end, and at least one slot in communication with the passageway;
   a shell comprising an outlet therein; and
   a pipe leading to the outlet from a pump in the shell, wherein the valve is detachably connected to the pipe so that water can flow from a pump in the shell into the hose through the valve, wherein water can flow into the passageway through the slot when the core is pushed by an end of the hose, wherein the valve automatically blocks the flow of the water from the hose after the valve is detached from the pipe.

18. The direct-current sprayer according to claim 17 wherein the shell comprises a pocket thereon for storing the hose.

19. The direct-current sprayer according to claim 17 comprising a joint for connecting the hose to the valve.

20. The direct-current sprayer according to claim 19 wherein the joint comprises a first section for insertion in the hose and a second section for receiving a portion of the valve.

21. The direct-current sprayer according to claim 20 wherein the joint comprises a thread on an internal side of the second section, wherein the joint comprises a thread for engagement with the thread of the joint.

22. The direct-current sprayer according to claim 21 comprising a strap for tightening the hose around the first section of the joint.

23. The direct-current sprayer according to claim 17 comprising a joint for easy connection of the pipe to the valve, with the joint comprising a first section for insertion in the pipe, a second section for abutment with the valve and a third section for easy connection to the valve.

24. The direct-current sprayer according to claim 23 comprising a ferrule for tightening the hose around the first section of the joint and a seal around the third section of the joint for sealing contact with an internal side of the valve, wherein the joint comprises, around the third section, a groove for receiving the seal, wherein the second section of the joint is a flange.

25. The direct-current sprayer according to claim 23 comprising a shackle movable on the valve between a locking position for locking the third section of the joint and a releasing position for releasing the third section of the joint.

26. A direct-current sprayer for spraying water comprising:
   a hose;
   a valve connected to the hose;
   a shell comprising an outlet therein;
   a pipe leading to the outlet from a pump in the shell, wherein the valve is detachably connected to the pipe so that water can flow from a pump in the shell into the hose through the valve, wherein the valve automatically blocks the flow of the water from the hose after the valve is detached from the pipe;
   a joint for easy connection of the pipe to the valve, with the joint comprising a first section for insertion in the pipe, a second section for abutment with the valve and a third section for easy connection to the valve;
   a ferrule for tightening the hose around the first section of the joint and a seal around the third section of the joint for sealing contact with an internal side of the valve, wherein the joint comprises, around the third section, a groove for receiving the seal, wherein the second section of the joint is a flange; and
   a shackle movable on the valve between a locking position for locking the third section of the joint and a releasing position for releasing the third section of the joint;
   wherein the shackle defines an opening through which the third section of the joint can be inserted into the valve wherein the joint comprises, on the third section, a neck that can be locked by means of the shackle.

27. The direct-current sprayer according to claim 26 wherein the valve comprises a housing and a core movable in the housing.

28. The direct-current sprayer according to claim 27 wherein the housing comprises, on an internal side, a rib for abutment with the core in order to block the flow of the water.

29. The direct-current sprayer according to claim 17 wherein the rib comprises an inclined side for contact with the core.

30. The direct-current. sprayer according to claim 17 comprising a seal for sealing contact with the rib.

31. The direct-current sprayer according to claim 28 wherein the core comprises a close end, an open end, a passageway extending to the open end from the closed end, at least one slot in communication with the passageway so that the water can flow into the passageway through the slot when the core is pushed by an end of the hose.

32. A direct-current sprayer for spraying water comprising;
   a hose;
   a valve connected to the hose;
   a shell comprising an outlet therein;

a pipe leading to the outlet from a pump in the shell, wherein the valve is detachably connected to the pipe so that water can flow from a pump in the shell into the hose through the valve, wherein the valve automatically blocks the flow of the water from the hose after the valve is detached from the pipe;

a joint for easy connection of the pipe to the valve, with the joint comprising a first section for insertion in the pipe, a second section for abutment with the valve and a third section for easy connection to the valve;

a ferrule for tightening the hose around the first section of the joint and a seal around the third section of the joint for sealing contact with an internal side of the valve, wherein the joint comprises, around the third section, a groove for receiving the seal, wherein the second section of the joint is a flange;

a shackle movable on the valve between a locking position for locking the third section of the joint and a releasing position for releasing the third section of the joint; and a latch with a neck, wherein the shackle defines a slit for receiving the neck of the latch, thus avoiding detachment of the shackle from the valve.

* * * * *